Patented June 27, 1933

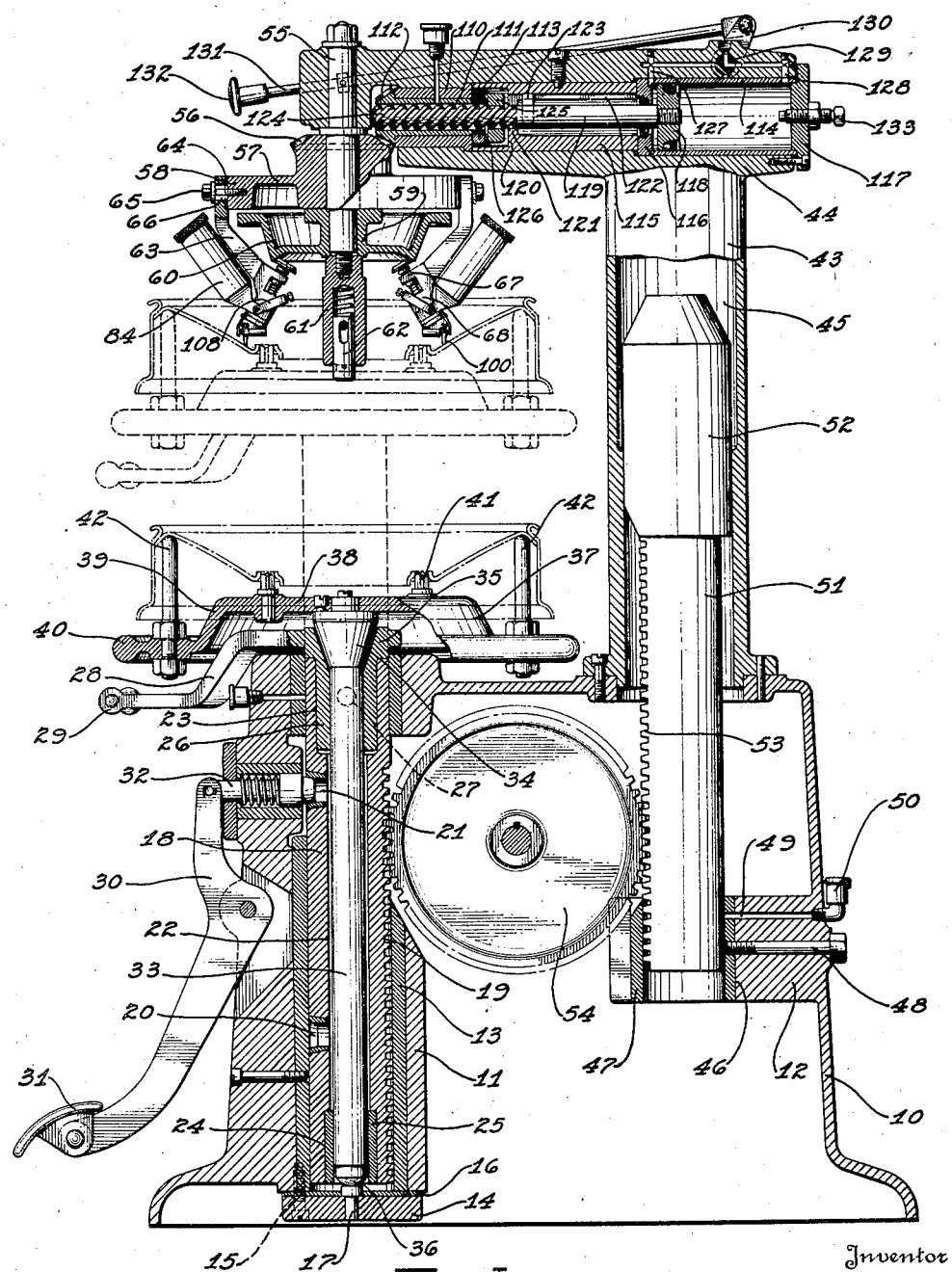

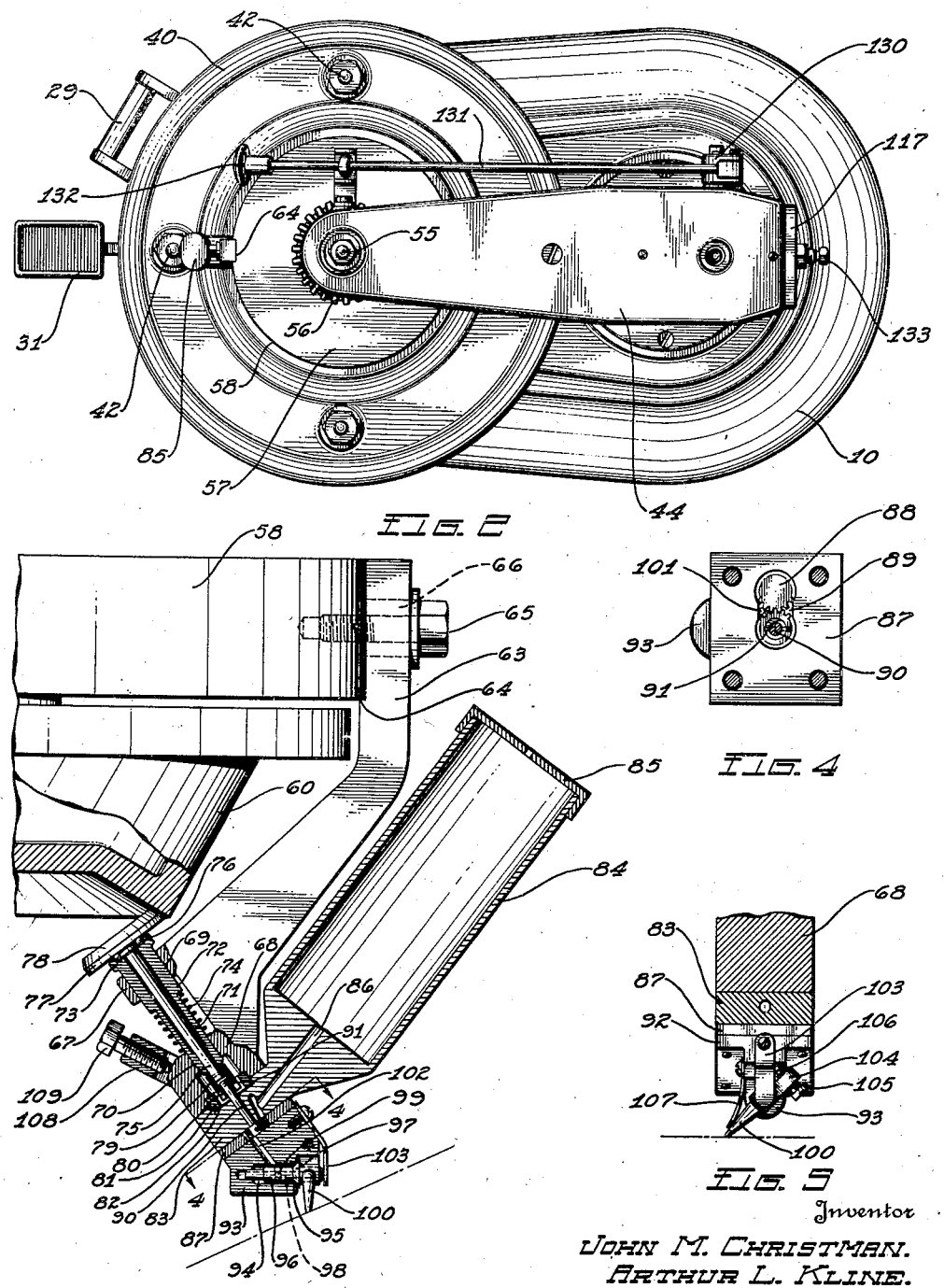

1,915,646

UNITED STATES PATENT OFFICE

JOHN M. CHRISTMAN AND ARTHUR L. KLINE, OF DETROIT, MICHIGAN, ASSIGNORS TO PACKARD MOTOR CAR COMPANY, OF DETROIT, MICHIGAN, A CORPORATION OF MICHIGAN

STRIPING MACHINE

Application filed February 1, 1929. Serial No. 336,831.

This invention relates to striping machines and more particularly to machines for striping wheels.

An object of the invention is to provide a machine for applying an annular stripe of substantially uniform width and thickness.

Another object of the invention is to provide a machine for applying a plurality of annular stripes arranged in spaced relation and of substantially uniform width and thickness.

Another object of the invention is to provide a machine by which there may be applied quickly and accurately upon a work piece, such as a wheel, a stripe of paint or similar substance of substantially uniform width and thickness.

A further object of the invention is to provide a machine by which there may be applied upon a work piece a plurality of spaced annular stripes of various colors and of uniform width and thickness.

A further object of the invention is to provide a machine by which an operator of no particular skill may quickly, accurately and simultaneously apply upon a work piece a plurality of annular stripes arranged in spaced relation and of various colors and widths, each stripe being uniform as to width and thickness.

A further object of the invention is to provide a machine by which there may be simultaneously applied upon a wheel a plurality of stripes at a rate proportionate to the rate of movement of the machine.

Yet a further object of the invention is to provide a machine having an adjustable support for a wheel and a pneumatically operated means for applying a plurality of stripes to the wheel in proportion to the rate of movement of the machine.

Still a further object of the invention is to provide a machine by which a plurality of annular stripes may be applied upon a work piece simultaneously and accurately, a machine highly efficient in operation and yet of marked simplicity as a whole and in respect to each of its component parts, so that its manufacture may be economically facilitated, both as regards parts and their assembly.

Other objects of the invention will appear from the following description taken in connection with the drawings which form a part of this specification, and in which:

Fig. 1 is a vertical sectional view of a machine embodying the invention;

Fig. 2 is a top plan view;

Fig. 3 is a fragmentary view, partly in section;

Fig. 4 is a sectional view on line 4—4, Fig. 3, and

Fig. 5 is a detail view of the nozzle.

Referring to the drawings for more specific details of the invention, 10 represents a base comprising a hollow casting having formed therein a cylinder 11 and a boss 12. As shown, the cylinder is divided into upper and lower portions having fitted snugly therein a divided bushing 13, and the lower end of the cylinder is closed by a suitable plate 14 secured in position as by bolts 15 with a shim 16 interposed.

In the center of the plate 14, which is the axis of the cylinder, is a headed pin or button 17, the object of which will hereinafter appear, and positioned for reciprocation in the bushing 13 is a shaft 18 having formed in its circumference a longitudinal rack 19 and spaced radial bores or recesses 20 and 21 each provided with a suitable bushing.

The shaft 18 is axially bored as indicated at 22 and the respective ends of the shaft are counterbored as at 23 and 24. A bearing 25 is fitted closely in the bore 24 and a bearing 26 is keyed in the bore 23 by a pin 27. The upper end of the bearing 26 is enlarged and fitted thereon is an arm 28 having on its free end a handle 29 by means of which the shaft 18 may be vertically reciprocated.

Pivotally supported in the wall of the base is a lever 30 having a foot pedal 31 on its lower end for the operation thereof and pivotally connected to its upper end is a spring pressed plunger 32, the free end or head of which is adapted to engage the radial bores or recesses 20 and 21 in the shaft 18 to lock the shaft at different elevations.

Mounted for reciprocation in the bearings 25 and 26 in the shaft 18 is a shaft 33, the upper end of which has an enlarged conical portion 34 adapted to engage a shoulder 35 in the bearing 26 and the lower end of the shaft is rounded as indicated at 36. When the shaft 18 is in the lowered position the spring actuated plunger 32 is in engagement with the radial bore or recess 21 and the lower rounded end of the shaft 33 bears against the pin or button 17 positioned to support the shaft with a clearance between the conical shaped portion on the upper end thereof and the shoulder 35 in the bearing 26, a proper adjustment being made by shims, one of which is indicated at 16. When so supported, the shaft 33 may be rotated with a minimum degree of friction.

Suitably secured on the upper end of the shaft 33 is a wheel support or carrier 37. As shown, the wheel support or carrier comprises a plate 38 having a downwardly and outwardly extending flange 39 on the periphery of which is formed a rim 40 providing a suitable hand grip so that the shaft 33 and the support or carrier mounted thereon may be easily and freely rotated.

The wheel support or carrier has positioned thereon a plurality of studs 41 adapted to engage the stud holes in the mounting flange of a disk wheel and a plurality of spaced pins 42 adapted to engage the disk of the wheel adjacent the rim thereof. By this arrangement of studs and pins, the wheel is supported on the carrier in substantially a horizontal position and is secured against relative rotation. It is, of course, to be understood that a different form of carrier for a different make of wheel might well be employed with equally good results.

Positioned on the base is a column 43 having on the upper end thereof an arm 44. This column has a double diametral bore 45 in axial alignment with a bore 46 in the boss 12, and the bore 46 is provided with a bearing 47 secured in position as by a bolt 48. The bearing and boss have an oil duct 49 therein into which is threaded an oil cup 50.

Mounted for reciprocation in the bearing 47 is a shaft 51 having formed thereon an enlarged portion or head 52 slidably positioned in the column in the bore of smaller diameter. The shaft 51 is relatively large and is provided with a circumferential longitudinal rack 53. Diametrically disposed with respect to the rack 19 in the shaft 18 and positioned for rotation between the shafts 18 and 51 and in mesh with the racks thereon is a spur gear 54. The relative weight of the shaft 51 and the shaft 18 with the parts carried thereby and the conventional disk wheel positioned on the carrier are substantially balanced, so that upon raising or lowering the shaft 18 by the handle 29, the labor imposed on the operator of the machine is negligible.

Supported in a fixed position by the arm 44 in the axis of the shaft 33 is a shaft 55 and supported for rotation on the shaft 55 is a beveled gear 56, on the hub of which is a radial flange 57 having a rim 58. The gear 56 is retained on the shaft 55 by a collar 59 having a radial flange 60 provided with a downwardly inclined portion and an upwardly and outwardly extending portion parallel with the flange on the hub of the beveled gear 56, and threaded on the lower end of the shaft is a sleeve 61 having positioned therein a spring actuated resilient stop member 62, the purpose of which will hereinafter appear.

Adjustably secured on the rim 58 are brackets 63. As shown, the brackets 63 are positioned in slots 64 in the face of the rim and are secured therein as by bolts 65 passing through slots 66 in the brackets and threaded into the rim. These brackets support the striping devices. As shown, the free end of each bracket is bifurcated to provide oppositely disposed arms 67 and 68 having therein in axial alignment bores 69 and 70 in which is positioned for reciprocation a sleeve 71, the upper end of which has an enlarged portion 72 and a radial flange 73, and a coil spring 74 is positioned on the sleeve intermediate the enlarged portion 72 and the arm 68.

A shaft 75 is positioned for rotation in the sleeve 71 on ball bearings 76. This shaft has on one end a flange 77 provided with a beveled periphery 78 for engaging the inclined portion of the stationary flange 60 on the retaining collar 59, and is held in engagement therewith by the coil spring 74. Keyed or otherwise secured on the other end of the shaft is a sleeve 79 for retaining the shaft within the sleeve 71 and the sleeve 79 is slotted as indicated at 80 to provide a coupling for the driving shaft of a pump mechanism, to be hereinafter described.

Positioned in the arm 68 is a sleeve 81 having a press fit in the bore in the arm and extending outwardly therefrom to engage a recess 82 in a plate 83. The plate 83 is formed integral with a container 84 which is provided with a cap 85 having the conventional vent and a discharge passage 86. A plate 87 is suitably secured to the plate 83 and positioned in the plate 87 is a pump mechanism 88, the intake 89 of which communicates with the passage 86. The pump has a driving shaft 90 which extends through the plate 83 and is provided with a diametrical pin 91 adapted to engage the slot in the sleeve 79, the connection being such that longitudinal adjustment may be had between the shafts 75 and 90.

A cover plate 92 is provided for the pump mechanism. This plate is suitably secured to the plate 83 on the container 84 with the plate 87 carrying the pump mechanism interposed. As shown, the cover plate has a boss 93 having a double diametral bore 94 and a shoulder 95. A shaft 96 having a double diameter is fitted in the bore and this shaft has an enlarged head providing a shoulder 97. The shaft is axially bored as indicated at 98 and is provided with radial bores or openings 99 communicating with the axial bore.

A nozzle 100 has a press fit on the head of the shaft 96 and the passage in the nozzle communicates with the axial bore in the shaft. That portion of the shaft having the smaller diameter is fitted for smooth rotation in that portion of the bore having the smaller diameter. The shoulder 95 in the bore receives the shoulder 97 on the shaft and that portion of the shaft having the larger diameter is positioned in that portion of the bore having the larger diameter with a clearance between the shaft and the wall defining the bore, and leading from the bore to the outlet 101 of the pump mechanism is a passage 102.

The shaft 96 supporting the nozzle is retained within the bore 94 by a spring 103 having one end secured to the cover plate 92 and its other end engaging the outer end of the shaft, and the nozzle is provided with a rearwardly extending arm 104 having threaded therein a set screw 105 adapted to engage a stop 106 against which it is normally pressed by a spring 107. This spring also serves to press the nozzle in engagement with the work piece or wheel to be striped.

Pivotally secured to the plate 83 is a yoke 108 and mounted in the yoke is a screw 109. The plate 83 is positioned on the arm 68 with the sleeve 81 in the arm seated in the recess 82 in the plate and the shafts 75 and 90 interlocked. With the parts in this position the yoke is adjusted to straddle the arm and the screw is set to clamp the parts together.

The brackets 63 and the striping devices supported thereby are adjustable laterally, so that the nozzles 100 may be adjusted in spaced relation with respect to the axis of the shaft 55. When so adjusted the striping devices will operate to apply stripes upon the wheels according to the desired arrangement. It is, of course, to be understood that the stripes may be varied in width by the employment of striping devices of varied capacities, and, it is also to be understood that the striping devices may be supplied with different colored paints or other substances to vary the color of the stripes, and that the character of the striping devices is such that the paint will be metered and applied at a rate commensurate with the rate of movement of the devices and hence each stripe may be laid with substantially a uniform width and thickness.

The arm 44 is axially bored and positioned in the bore in the forward end of the arm is a bearing 110 in which is mounted for rotation a sleeve 111. The forward end of the sleeve has thereon a beveled gear 112 in mesh with the beveled gear 56 on the shaft 55 and a retaining nut 113 is threaded on the rear end of the sleeve. The retaining nut also provides a suitable connection for the driving mechanism.

Positioned in the bore in the arm 44 at the rear end thereof is a cylinder 114 and arranged intermediate the cylinder 114 and the sleeve 110 is a sleeve 115. The respective ends of the cylinder are provided with heads 116 and 117 and positioned in the cylinder is a piston 118 having a rod 119 extending through the head 116, the sleeve 115 and into the sleeve 111 with clearance between the rod and the wall of the sleeve.

The sleeve 115 is recessed to form a shoulder 120, and has an internal flange 121 providing a suitable support for the rod 119, and is longitudinally slotted as indicated at 122 to receive a key 123 carried by the rod to retain the rod against rotation, and the rod is threaded as at 124 to receive a nut 125 positioned thereon between the retaining nut 113 on the sleeve 111 and the shoulder 120 with small longitudinal play, and suitable dogs or interlocking means 126 are provided between the retaining nut 113 and the nut 125.

Arranged in the respective ends of the cylinder are ports 127 and 128 having suitable passages leading therefrom to a valve 129 connected to a suitable source of compressed air. The valve is controlled by a lever 130 operated by a push rod 131 having a knob or handle 132 positioned on the front of the machine, and the head 117 of the cylinder has positioned therein a set screw 133 for limiting the movement of the piston 118, the object of which will hereinafter appear.

In operation, a wheel is placed on the carrier where it is supported by the pins 42 and retained against relative rotation by the studs 41. With the wheel in this position, the lever 30 is actuated by the foot pedal 31 to withdraw the spring pressed plunger 32 from the recess 21 in the shaft 18, whereupon the carrier may be raised by the handle 29 to engage the spring pressed stop member 62 in the sleeve 61, as shown in dotted lines in Fig. 1, and its upward progress is thus resiliently retarded.

Upon raising the carrier to the elevated position, the conical head on the shaft 18 seats on the shoulder in the bearing 26, the lever 30 is then released and the plunger 32 engages the recess 20 to lock the carrier against movement. When the carrier is in the elevated position the nozzles 100 are pressed against the work piece or wheel by the springs 107.

Assuming that the containers 84 have been previously supplied with lacquer, paint or other suitable material for striping, and that the carrier is in the elevated position, the handle 132 is drawn forward to actuate the valve 129, whereupon air admitted through the valve 129 enters the cylinder through the port 128, causing the piston to move forward, whereupon the nut 125 is moved longitudinally to interlock the nut 125 with the retaining nut 113, whereupon further movement of the piston forward causes the nut 125 to revolve and to carry with it the retaining nut 113 and hence the sleeve 111 and gear 112.

The gear 112 is in mesh with the beveled gear 56 and thus will rotate the striping devices therewith. The operating rollers 77 of the striping devices bear against the stationary flange on the retaining collar 59 causing the pump mechanisms to be driven to deliver paint from the containers 84 through the pumps to the nozzles 100 from whence it is applied upon the work piece or wheel to be striped at a rate proportionate to the rate of rotation of the operating rollers 77 or the driving means therefor.

The piston 118 is limited in its movement by the set screw 133 so that the striping devices make one complete revolution, hence the liability of overlapping the stripe is avoided. It has been frequently found desirable to complete the stripe with the exception of a small fraction of an inch and when so applied it is finished by hand. Upon completion of the machine work the foot pedal 31 is pressed to release the shaft 18, whereupon the spring pressed plunger 62 acts to move the shaft downwardly, so that the nozzles 100 are instantly disengaged from the work piece to prevent excess paint from being deposited thereon. When the shaft 18 is further lowered to engage the spring pressed plunger 32 in the recess 21 the support may be freely rotated by the hand grip 40, so that the stripe may be thoroughly inspected and touched up if found necessary.

Although this invention has been described in connection with certain specific embodiments, the principles involved are susceptible of numerous other applications, which will readily occur to persons skilled in the art. The invention is therefore, to be limited only by the scope of the appended claims.

Having thus described our invention, what we claim as new and desire to secure by Letters Patent is:

1. A striping machine comprising a support, a rotatable head cooperating therewith, stripe applying devices including pump means carried by the head and means associated to rotate with the head for operating the pump means of the devices.

2. A striping machine comprising a support, a rotatable head cooperating therewith, means for rotating the head, striping devices on the head including pump means and means associated to rotate with the head for operating the pump means of the devices.

3. A striping machine comprising a movable support, a rotatable head cooperating therewith, means for rotating the head, stripe applying devices carried by the head each including a driven pump, and a stationary means cooperating with the head for rotating the pumps.

4. A striping machine comprising a reciprocatory support, means for locking the support in a plurality of positions, a rotatable head cooperating with the support, means for rotating the head, stripe applying devices on the head including pressure means, and means coacting with the head for actuating the pressure means.

5. A striping machine comprising a movable support for carrying an article to be striped, a rotatable head cooperating with the support, pressure actuated means for rotating the head, a striping device including a pump carried by the head, and means coacting with the head for operating the pump at a rate proportionate to the rate of movement of the head.

6. A striping machine comprising an adjustable support, a rotatable head cooperating with the support, pneumatic means for rotating the head, a plurality of striping devices including pumps carried by the head and a fixed member coacting with the head to operate the pumps at a rate proportionate to the rate of movement of the head.

7. A striping machine comprising a balanced support, means for locking the support in a plurality of positions, a rotatable head cooperating with the support, pneumatic means for rotating the head, striping devices on the head, each striping device including a pump, and a stationary member coacting with the head for operating the pumps at a rate commensurate with the rate of movement of the head.

8. A striping machine comprising a vertically adjustable and rotatable support, a rotatable head cooperating therewith, pneumatic means for rotating the head, a fixed member coacting with the head, a plurality of striping devices on the head including pumps, and driving means for the pumps engaging the fixed member.

9. A striping machine comprising a support, a movable head and a fixed member, striping devices on the head including pumps, and means for operating the pumps engaging and actuated by contact with the fixed member.

10. A striping machine comprising a support, a movable head and a fixed member, striping devices including pumps arranged upon the head in spaced relation with respect to the axis of the head, and means for operating the pumps actuated by engaging the fixed member.

11. A striping machine comprising a fixed member, a rotatable member and a striping device including pump mechanism carried by the rotatable member and operated by contact with the fixed member.

12. A striping machine comprising a fixed member, a movable member, pressure means for actuating the movable member, a striping device including a pump carried by one of the members and means engaging the other member for actuating the pump.

13. A striping machine comprising a fixed member, a rotatable member, a pressure means operated at will for actuating the rotatable member, a striping device on the rotatable member including a pump and pump driving means engaging the fixed member and actuated thereby during operation of the rotatable member.

14. A striping machine comprising a fixed member and a movable member, a striping device including a pump carried by one of the members and actuated by the other member and means for actuating the movable member including a screw and means for reciprocating the screw.

15. A striping machine comprising a fixed member, a movable member, a striping device fixed to one of the members and actuated by the other member, and means for actuating the movable member including a driving pinion, a screw for actuating the pinion and a pressure operated means for actuating the screw.

16. In a striping machine comprising a fixed member, a movable member, a striping instrument, said instrument being carried by one of the members and the other of said members supporting an article to be striped, and means for actuating the movable member including a driving pinion, a pressure actuated piston and a screw operatively connecting the piston and the driving pinion.

17. In a striping machine, a work carrying structure comprising a hollow shaft, means for reciprocating the shaft, means for locking the hollow shaft in a plurality of positions, a shaft mounted for rotation in the hollow shaft, a support on the rotatable shaft and a work carrying rim on the support; and a striping instrument rotatably mounted axially of the rim for striping work.

18. In a striping machine comprising a striping instrument, a hollow shaft mounted for movement toward and away from the instrument, means for locking the shaft in a plurality of positions, a shaft mounted for rotation in the hollow shaft, a work support on the shaft, a fixed stop at one end of the shaft, a cushioned stop at the other end of the shaft, and means balancing the hollow shaft and the parts carried thereby.

19. In a striping machine comprising a striping instrument, a hollow shaft, means for raising and lowering the hollow shaft toward and away from the instrument, a shaft positioned for rotation in the hollow shaft, a work support on the upper end of the shaft, an abutment adapted to engage the shaft when in a lowered position, a cushioned abutment adapted to engage the shaft when in a raised position and a balance for the hollow shaft and parts carried thereby.

20. In a striping machine comprising a striping instrument, a hollow shaft, a handle for raising and lowering the hollow shaft toward and away from the instrument, means for locking the hollow shaft in raised and lowered positions, a shaft mounted for rotation and slight reciprocation in the hollow shaft, a head on the upper end of the shaft, a work support secured to the head, a rim on the support, an abutment adapted to engage the shaft when in the lowered position and to support the shaft for free rotation, a cushioned abutment adapted to engage the shaft when in the raised position to seat the head in the hollow shaft and retain the shaft against rotation, and a balance for the hollow shaft and the parts carried thereby.

21. A striping machine comprising a member having a double diametral bore, a shoulder in the bore, a double diametral shaft fitted in the bore, a shoulder on the shaft engaging the shoulder in the bore, the shaft having an axial bore and a radial bore communicating with the axial bore, a nozzle on the shaft having a passage therein communicating with the axial bore in the shaft and a spring for retaining the shaft in position.

22. A striping machine comprising a cover plate, a boss on the plate having a double diametral bore, a shoulder at the open end of the bore, a double diametral shaft fitted for oscillation in the bore, a shoulder on the shaft engaging the shoulder of the bore, the shaft having an axial bore and radial bores communicating with the axial bore, a nozzle on the shaft having a passage communicating with the axial bore in the shaft, means retaining the nozzle in position and means limiting the oscillatory movement of the nozzle.

23. In a striping machine, an adjustable support for carrying an article to be striped, a rotatable head, a striping instrument including a pump carried by the rotatable head in a relation to apply a circular stripe to the article carried by the support, and a fixed member coacting with the head to operate the pump at a rate to dispense fluid from the instrument proportionate to the rate of movement of the head.

24. In a striping machine, a pair of members, one of which is rotatable, means for securing an article to be striped on one of the members, a striping instrument including a pump carried by the other member in a relation to deposit a circular stripe on the article, and means for operating the pump to deposit a fluid stripe at a rate proportionate to the rate of movement of the rotatable member.

25. In a striping machine, a rotatable head, a fluid dispensing instrument carried by the head, a movable support for an article to be striped by the instrument, said support being adapted to be moved into a position placing the article carried thereby adjacent the fluid dispensing instrument, and a counterbalance associated with the movable support.

26. In a striping machine, a rotatable head, a fluid dispensing instrument carried by the head, a movable support for an article to be striped by the instrument, said support being adapted to be moved into a relation placing the article carried thereby in position to receive a stripe from the instrument, a guided weight disposed adjacent the movable support, and means connecting the weight with the support in a counterbalanced relation.

27. In a striping machine, a base, a column secured to the base and terminating in an arm, a rotatable head carried by the arm, a pressure operated striping instrument depending from the head, a vertically adjustable hollow shaft in the base in a parallel plane with the column, said hollow shaft having a rack, work supporting means associated with the hollow shaft, a weighted shaft in the column and projecting into the base, said weighted shaft having a rack, and a gear in the base engaging the rack of the hollow support shaft and the weighted shaft, said weighted shaft counterbalancing the hollow support shaft and the work supporting means carried thereby.

28. In a striping machine, a rotatable head, striping instruments carried by the head, power operating means for rotating the head, a manual control for the power means, and means for varying the rotation effected by the power operating means.

29. In a striping machine, a rotatable member, a stationary member having a circular portion, a striping instrument carried by the rotatable member, said instrument having a gear pump, and driving means carried with said gear pump by the rotatable member including a roller contacting with the circular portion of the stationary member.

30. In a striping machine, a rotatable member, a stationary member having a circular surface, a striping instrument carried by the rotatable member, said instrument including a gear pump, an axial movable drive shaft for the pump movable with the instrument, a roller fixed to the drive shaft, and a spring for causing engagement of the roller with the circular surface of the stationary member.

31. In a striping machine, a rotatable member, a pair of members relatively movable, means for retaining an article to be striped associated with one of the members, brackets fixed to the other member, and striping instruments carried by the brackets, said instruments having nozzles extending intermediate the members and arranged to stripe the article carried by one of the members.

32. In a striping machine comprising a fixed member and a movable member, a striping device carried by one of the members, the other member being adapted to support work to be striped, and means for actuating the movable member including a driving pinion, a screw, means operatively connecting the pinion and the screw, and a pressure control means for actuating the screw.

33. In a striping machine, a rotatable member, a striping instrument carried by the member, a stationary member which the striping instrument engages during rotation of said rotatable member, and driving means for the rotatable member comprising a gear fixed to the member, a driving pinion in mesh with the gear, a cylinder, a piston in the cylinder, a screw connected to the piston, a nut on the screw, an interlocking connection between the nut and the pinion, and means admitting pressure in the cylinder for actuating the piston.

34. In a striping instrument, a work carrying structure comprising a hollow shaft, a handle for the reciprocation of the shaft, means for locking the hollow shaft in a plurality of positions, a shaft mounted for rotation in the hollow shaft, means for supporting the shaft for rotation when the hollow shaft is in one position, means tending to prevent rotation of the shaft when the hollow shaft is in another position, work securing means associated with the rotatable shaft; and a striping instrument adapted to be rotated in striping relation with the work carrying structure.

35. In a striping machine, a work carrying structure comprising a hollow shaft, a handle for reciprocating in the shaft, a spring-pressed plunger for locking the shaft in a plurality of positions, a shaft mounted for rotation in the hollow shaft, means for supporting the shaft for free rotation when the hollow shaft is in one position, means preventing rotation of the shaft when the hollow shaft is in another position, a support on the shaft, a rim on the support providing a hand-grip, means for securing work to the support; and a striping instrument mounted for rotation in striping relation with the work carried by said structure.

In testimony whereof we affix our signatures.

JOHN M. CHRISTMAN.
ARTHUR L. KLINE.